United States Patent
Ko et al.

(10) Patent No.: US 12,531,036 B2
(45) Date of Patent: *Jan. 20, 2026

(54) SMART CAMERA USER INTERFACE

(71) Applicant: Google LLC, Mountain View, CA (US)

(72) Inventors: Teresa Ko, Los Angeles, CA (US); Hartwig Adam, Marina del Rey, CA (US); Mikkel Crone Koser, Copenhagen (DK); Alexei Masterov, Mountain View, CA (US); Andrews-Junior Kimbembe, San Francisco, CA (US); Matthew J. Bridges, New Providence, NJ (US); Paul Chang, New York, NY (US); David Petrou, Brooklyn, NY (US); Adam Berenzweig, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,812

(22) Filed: Mar. 25, 2024

(65) Prior Publication Data

US 2024/0233683 A1    Jul. 11, 2024

Related U.S. Application Data

(63) Continuation of application No. 18/082,243, filed on Dec. 15, 2022, now Pat. No. 11,967,299, which is a
(Continued)

(51) Int. Cl.
*G09G 5/36* (2006.01)
*G06F 3/04817* (2022.01)
(Continued)

(52) U.S. Cl.
CPC ......... *G09G 5/363* (2013.01); *G06F 3/04817* (2013.01); *G06F 3/04842* (2013.01);
(Continued)

(58) Field of Classification Search
CPC ............. G06F 3/04817; G06F 3/04842; G06F 3/14301; G06F 3/1438; H04N 23/62;
(Continued)

(56) References Cited

U.S. PATENT DOCUMENTS 7,904,187 B2   3/2011   Hoffberg et al.
9,019,415 B2   4/2015   Ma et al.
(Continued)

FOREIGN PATENT DOCUMENTS

CN   1475908 A    2/2004
CN   102222079 A  10/2011
(Continued)

OTHER PUBLICATIONS

International Search Report and Written Opinion for International Application No. PCT/US2015/014414, mailed on May 11, 2015, 8 pages.
(Continued)

*Primary Examiner* — Marly S Camargo
(74) *Attorney, Agent, or Firm* — DORITY & MANNING P.A.

(57) ABSTRACT

Implementations of the present disclosure include actions of receiving image data of an image capturing a scene, receiving data describing one or more entities determined from the scene, the one or more entities being determined from the scene, determining one or more actions based on the one or more entities, each action being provided at least partly based on search results from searching the one or more entities, and providing instructions to display an action interface comprising one or more action elements, each
(Continued)

action element being to induce execution of a respective action, the action interface being displayed in a viewfinder.

20 Claims, 3 Drawing Sheets

Related U.S. Application Data continuation of application No. 17/340,868, filed on Jun. 7, 2021, now Pat. No. 11,570,365, which is a continuation of application No. 16/881,816, filed on May 22, 2020, now Pat. No. 11,032,478, which is a continuation of application No. 16/569,273, filed on Sep. 12, 2019, now Pat. No. 10,701,272, which is a continuation of application No. 15/946,342, filed on Apr. 5, 2018, now Pat. No. 10,440,279, which is a continuation of application No. 15/428,821, filed on Feb. 9, 2017, now Pat. No. 9,973,705, which is a continuation of application No. 14/618,962, filed on Feb. 10, 2015, now Pat. No. 9,600,724.

(60) Provisional application No. 61/937,833, filed on Feb. 10, 2014.

(51) Int. Cl.
| | | |
|---|---|---|
| *G06F 3/04842* | (2022.01) | |
| *G06F 3/14* | (2006.01) | |
| *G06V 10/10* | (2022.01) | |
| *G06V 20/20* | (2022.01) | |
| *G06V 20/30* | (2022.01) | |
| *G06V 20/70* | (2022.01) | |
| *H04N 23/62* | (2023.01) | |
| *H04N 23/63* | (2023.01) | |

(52) U.S. Cl.
CPC .......... *G06F 3/1431* (2013.01); *G06F 3/1438* (2013.01); *G06V 10/10* (2022.01); *G06V 20/20* (2022.01); *G06V 20/30* (2022.01); *G06V 20/70* (2022.01); *H04N 23/62* (2023.01); *H04N 23/63* (2023.01); *H04N 23/631* (2023.01); *G09G 2360/08* (2013.01)

(58) Field of Classification Search
CPC ...... H04N 23/63; H04N 23/631; G09G 5/363; G06V 10/10; G06V 20/20; G06V 20/30
See application file for complete search history.

(56) References Cited

U.S. PATENT DOCUMENTS

| | | |
|---|---|---|
| 9,595,059 B2 | 3/2017 | Knudson et al. |
| 9,600,724 B2 | 3/2017 | Ko et al. |
| 9,973,705 B2 | 5/2018 | Ko et al. |
| 9,975,705 B2 | 5/2018 | Kinugawa et al. |
| 10,404,636 B2 | 9/2019 | Rodriguez et al. |
| 10,412,030 B2 | 9/2019 | McGregor, Jr. et al. |
| 10,440,279 B2 | 10/2019 | Ko et al. |
| 11,073,375 B2 | 7/2021 | Dryer et al. |
| 11,570,365 B2 | 1/2023 | Ko et al. |
| 11,967,299 B2 * | 4/2024 | Ko .................... G09G 5/36 |
| 11,978,271 B1 * | 5/2024 | Kharbanda ........... G06V 20/20 |
| 12,405,700 B2 * | 9/2025 | Paul .................. G06F 3/04847 |
| 2007/0162942 A1 | 7/2007 | Kimmo |
| 2010/0260426 A1 | 10/2010 | Huang |
| 2011/0145068 A1 | 6/2011 | King et al. |
| 2011/0164163 A1 | 7/2011 | Bilbrey et al. |
| 2012/0033876 A1 | 2/2012 | Momeyer |
| 2012/0041941 A1 | 2/2012 | King |
| 2012/0041973 A1 | 2/2012 | Kim |
| 2012/0224743 A1 | 9/2012 | Rodriguez et al. |
| 2012/0322428 A1 | 12/2012 | Lupoli et al. |
| 2013/0021266 A1 | 1/2013 | Selim |
| 2013/0050507 A1 | 2/2013 | Syed |
| 2013/0061148 A1 | 3/2013 | Das et al. |
| 2013/0260727 A1 | 10/2013 | Knudson et al. |
| 2013/0346235 A1 | 12/2013 | Lam |
| 2014/0071324 A1 | 3/2014 | Tokunaga et al. |
| 2016/0043817 A1 | 2/2016 | Handoush et al. |
| 2018/0227498 A1 | 8/2018 | Ko et al. |
| 2018/0295081 A1 | 10/2018 | McGregor et al. |
| 2021/0248360 A1 * | 8/2021 | Park ..................... G06V 20/53 |
| 2025/0240561 A1 * | 7/2025 | Zumbrunnen ......... H04N 23/62 |

FOREIGN PATENT DOCUMENTS

| | | |
|---|---|---|
| CN | 102395966 A | 3/2012 |
| CN | 102467574 A | 5/2012 |
| CN | 103548025 A | 1/2014 |
| EP | 1376392 | 1/2004 |

OTHER PUBLICATIONS

Office Action issued in Australian Application No. 2015214298, mailed on Nov. 2, 2017, 3 pages.

Yeh et al., "Searching the Web with Mobile Images for Location Recognition", 2004 Institute of Electrical and Electronics Engineers Computer Society Conference on Computer Vision and Pattern Recognition, vol. 2, CVPR 2004, pp. 1-6.

\* cited by examiner

SMART CAMERA USER INTERFACE

PRIORITY CLAIM

This application is a continuation of, and claims priority to, U.S. patent application Ser. No. 18/082,243, titled "SMART CAMERA USER INTERFACE", filed on Dec. 15, 2022, which U.S. patent application Ser. No. 17/340,868, titled "SMART CAMERA USER INTERFACE", filed on Jun. 7, 2021, which is a continuation application of, and claims priority to, U.S. patent application Ser. No. 16/881,816, now U.S. Pat. No. 11,032,478, titled "SMART CAMERA USER INTERFACE", filed on May 22, 2020, which is a continuation application of, and claims priority to, U.S. patent application Ser. No. 16/569,273, now U.S. Pat. No. 10,701,272, titled "SMART CAMERA USER INTERFACE", filed Sep. 12, 2019, which is a continuation application of, and claims priority to, U.S. patent application Ser. No. 15/946,342, now U.S. Pat. No. 10,440,279, titled "SMART CAMERA USER INTERFACE," filed on Apr. 5, 2018, which application is a continuation application of, and claims priority to, U.S. patent application Ser. No. 15/428,821, now U.S. Pat. No. 9,973,705, titled "SMART CAMERA USER INTERFACE," filed on Feb. 9, 2017, which application claims priority to U.S. patent application Ser. No. 14/618,962, now U.S. Pat. No. 9,600,724, titled "SMART CAMERA USER INTERFACE," filed on Feb. 10, 2015, which application claims the benefit of U.S. Provisional Application No. 61/937,833 filed on Feb. 10, 2014. The disclosure of each of the foregoing applications is incorporated herein by reference.

BACKGROUND

Users are increasingly using devices, such as smartphones, to capture images that contain information. In some instances, users capture images as keepsakes, for informational purposes, to share with other users, and/or as reminders, among other reasons.

SUMMARY

This specification relates to enabling execution of one or more actions based on content provided in image data.

Implementations of the present disclosure are generally directed to providing an action interface in a viewfinder of a camera application executed on a device, the action interface including action elements based on content of a scene.

In general, innovative aspects of the subject matter described in this specification can be embodied in methods that include actions of receiving image data, the image data being provided from a camera and corresponding to a scene viewed by the camera; receiving data describing one or more entities determined from the scene, the one or more entities being determined from the scene; determining one or more actions based on the one or more entities, each action being provided at least partly based on search results from searching the one or more entities; providing instructions to display an action interface comprising one or more action elements, each action element being to induce execution of a respective action, the action interface being displayed in a viewfinder. Other implementations of this aspect include corresponding systems, apparatus, and computer programs, configured to perform the actions of the methods, encoded on computer storage devices.

Particular implementations of the subject matter described in this specification can be implemented so as to realize one or more of the following advantages. In some examples, implementations of the present disclosure enable users to more easily fulfill in original intent when capturing an image. For example, although the user is capturing the image of a scene, the user's intent may actually be using the image as a reminder or as a contribution to a collection of images, e.g., photo album. In some examples, implementations enable users to use computing devices as a physical-to-digital converter, e.g., converting a real-world scene to a reminder. In some examples, implementations enable users to gain knowledge about entities depicted in images, e.g., providing actions based on search results.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
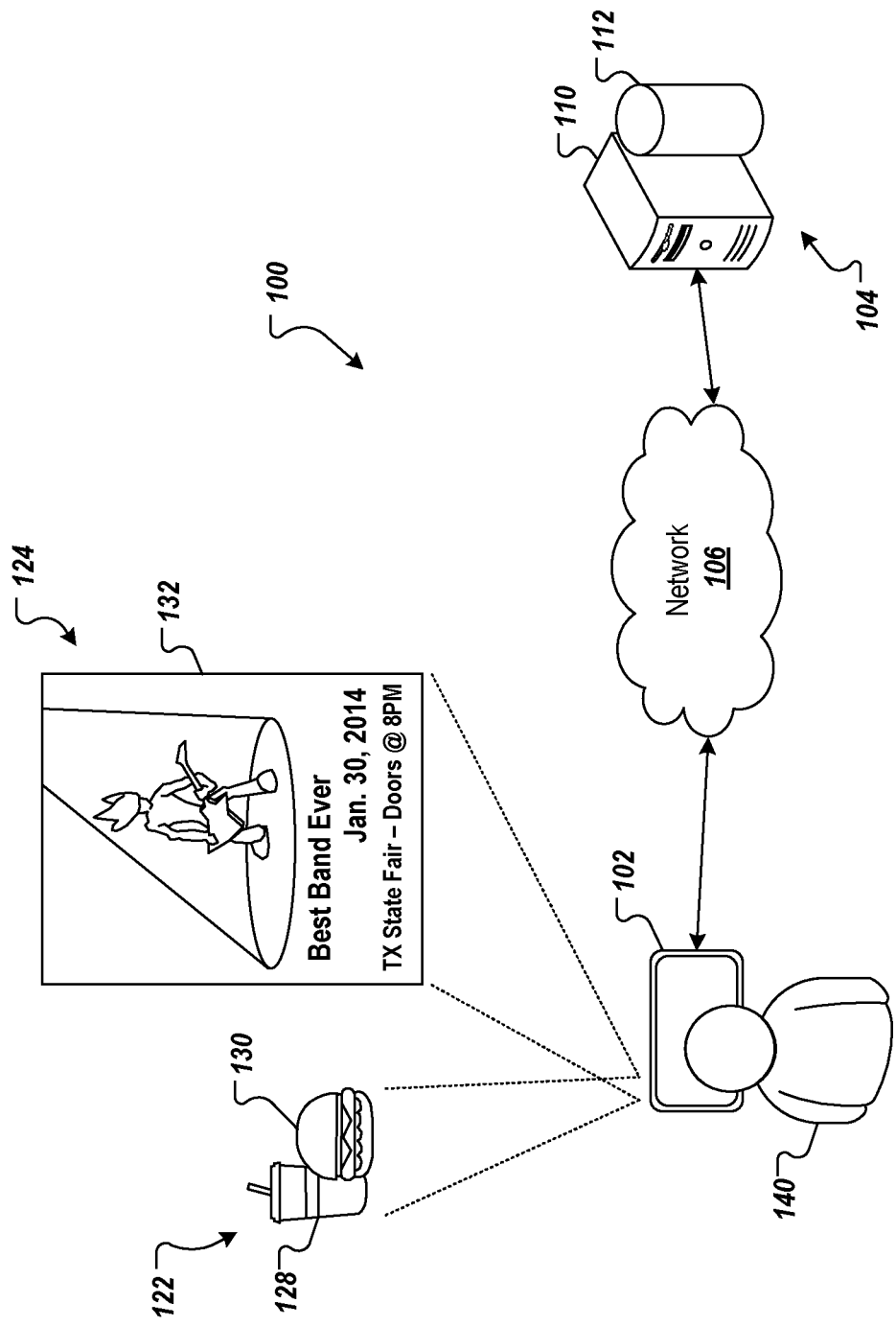
FIG. 1 depicts an example environment in which implementations of the present disclosure can be provided.

FIG. 1 depicts an example environment 100 in which implementations of the present disclosure can be provided. The example environment 100 includes a device 102, a server system 104 and a network 106. In some examples, the device 102 includes a personal computer, a mobile computing device, e.g., a smartphone, a wearable computing device, and/or a tablet computing device. The device 102 can send and receive data over the network 106. In the example of FIG. 1, the device 102 is provided as a smartphone, e.g., a phone that is enabled to communicate over the Internet. It is contemplated that implementations of the present disclosure can also be realized using other types of devices. In some examples, the network 106 includes a local area network (LAN), a wide area network (WAN), the Internet, or a combination thereof, that connects the device 102 and the server system 104. In some examples, the network 106 can be accessed over a wired and/or a wireless communications link. For example, the device 102 can utilize a cellular network to access the network 106. In some examples, the server system 104 includes a computing device 110 and computer-readable memory provided as a persistent storage device 112, e.g., database. In some examples, the server system 104 represents various forms of server systems including, but not limited to, a web server, an application server, a proxy server, a network server, or a server farm.

In some implementations, the device 102 includes a camera that can be used to provide image data. In some examples, the camera is integrated into the device 102. In some examples, the camera is in communication with the device 102. In some examples, the device 102 executes an application, e.g., a camera application provided as a computer-executable program, that enables the device 102 to provide image data based on scenes viewed by the camera.

In the example of FIG. 1, example scenes 122, 124 are provided. In some examples, a scene can include one or more entities, e.g., person, place, thing. For example, the scene 122 includes a drink 128 and a hamburger 130, and the scene 124 includes a poster 132.

In some examples, the device 102 displays a view-finder interface that enables a user 140 to view a scene using the camera. For example, the user 140 can manipulate the device 102 to point the camera toward a scene, e.g., the scenes 122, 124. In response, image data corresponding to the scene can be provided. In some examples, the image data can be processed to provide a graphical representation, e.g., image, of the scene. In some examples, the image data can be provided as pre-capture image data, e.g., as real-time data. In some examples, pre-capture image data includes image data corresponding to a scene and is provided before an image of the scene is captured, e.g., the user "snapping" a picture. In some examples, the image data can be provided as post-capture image data. In some examples, post-capture image data includes image data corresponding to a scene and is provided after an image of the scene is captured, e.g., in an image file provided in response to the user "snapping" a picture.

Implementations of the present disclosure are directed to providing an action interface for display in a viewfinder displayed on a device based on image data. In some examples, the viewfinder is provided by an image capturing application, e.g., camera application, executed on a computing device. More specifically, implementations of the present disclosure are directed to providing one or more annotations based on the image data, determining one or more actions based on the one or more annotations, and providing an action interface based on the one or more annotations. In some implementations the one or more actions are provided based on user-specific information. In some implementations, the action interface includes one or more action elements, each action element being selectable to induce execution of a respective action. Example actions can include a share content action that can be executed to share content, e.g., images, video, with other users, a purchase action that can be executed to purchase one or more items, a download action that can be executed to download content, e.g., music, video, images, an add event action that can be executed to add an event to a calendar, and an add to album action that can be executed to add content, e.g., images, to an album, e.g., photo album. Although example actions are provided herein, it is contemplated that implementations of the present disclosure can include any appropriate actions and respective action elements.

By way of example, a user can use a device, e.g., the device 102 of FIG. 1, which can provide first image data, e.g., pre-capture or post-capture, that can be displayed in a viewfinder, e.g., displayed on a display of the device. The first image data can be processed based on content of the first image data, as described herein, to provide a first action interface that includes a first set of action elements corresponding to respective actions. The user can use the device, e.g., the device 102 of FIG. 1, which can provide second image data, e.g., pre-capture or post-capture, that can be displayed in a viewfinder, e.g., displayed on a display of the device. The second image data can be processed based on content of the second image data, as described herein, to provide a second action interface that includes a second set of action elements corresponding to respective actions. In some examples, the first set of action elements is different from the second set of action elements.

Accordingly, implementations of the present disclosure enable action elements to be provided based on content that is represented in image data. This stands in contrast to, for example, functionality based on machine-readable codes that are depicted in image data. For example, image data can include a representation of a machine-readable code, e.g., a QR code, a bar code, which can be processed. In general, the machine-readable code encodes instructions that dictate functionality that can be executed, e.g., display information to a user, navigate to a website, play audio. In contrast, and as described in further detail herein, implementations of the present disclosure determine entities depicted in image data, determine one or more actions that could be executed based on the entities, and provide corresponding action elements in a viewfinder to enable the user to execute the actions.

In some implementations, and as noted above, the image data corresponds to a scene that is viewed by a camera. In some examples, the scene includes one or more entities that are represented in the image data. In some implementations, the image data is processed to identify the one or more entities. In some examples, the image data can be provided to an entity recognition engine, which processes the image data to provide a set of entities that are represented in the image data. In some examples, the entity recognition engine is provided as one or more computer-executable programs that can be executed by one or more computing devices, e.g., the device 102 and/or the server system 104. In some examples, the set of entities can include one or more entities. In some examples, the set of entities includes no entities, e.g., no entities are recognized by the entity recognition engine. In some implementations, entities can include specific entities. For example, an entity can include a hamburger that is depicted in the image data. In some examples, entities can include categories of entities. For example, an entity can include food. As another example, if a hamburger is depicted in the image data, the set of entities can include "hamburger" and "food," e.g., a specific entity and a corresponding category.

In some examples, one or more annotations are associated with each entity of the one or more entities. In some examples, the set of entities can be provided to an annotation engine, which processes the set of entities to provide a set of annotations. In some examples, the annotation engine is provided as one or more computer-executable programs that can be executed by one or more computing devices, e.g., the device 102 and/or the server system 104. In some implementations, the entity recognition engine and the annotation engine are combined, e.g., are the same engine.

In some examples, the set of annotations can include one or more annotations. In some examples, the set of annotations includes no annotations, e.g., no entities are included in the set of entities. In some examples, if no entities are included in the set of entities, the set of entities is not provided to the annotation engine. In some implementations, each annotation includes annotation data that can be appended to the underlying image data, e.g., the image data that was processed to provide the set of entities.

In some implementations, annotations can be provided based on searching entities using a search engine. In some examples, the annotation engine can provide an entity as a search query to the search engine, and the search engine can provide search results to the annotation engine. In some examples, annotations can be based on search results. For example, an entity can include the text "Best Band Ever," which is depicted in the image data, and which is the name of a band of musicians. In some examples, the text "Best Band Ever" can be provided as a search query to the search engine, and search results can be provided, which are associated with the particular band. Example search results can include tour dates, albums, and/or merchandise associated with the band, which search results can be provided as annotations.

In some implementations, annotations can relate entities depicted in the image data. For example, an entity can include the text "Best Band Ever," an entity can include the text "Jan. 30, 2014," and an entity can include the text "TX State Fair," e.g., as depicted in the scene 124 of FIG. 1. In some examples, the entities can be provided as search terms to the search engine, and in response, the search results include a concert by the Best Band Ever to be performed (or previously performed) at the TX State Fair on Jan. 30, 2014, which can be provided as an annotation.

In some implementations, annotations can be provided based on cross-referencing entities with a structured data graph, e.g., knowledge graph. In some examples, the structured data graph includes a plurality of nodes and edges between nodes. In some examples, a node represents an entity and an edge represents a relationship between entities. Nodes and/or entities of a structured data graph can be provided based on associations that have been determined between entities. In some examples, the structured data graph can be provided based on one or more schemas. In some examples, a schema describes how data is structured in the user-specific knowledge graph.

An example schema structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic.

In some implementations, the annotation engine can provide an entity as input to a structured data graph system, e.g., a knowledge graph system, and the structured data graph system can provide one or more annotations as output to the annotation engine. In some examples, the structured data graph system can cross-reference the entity with objects that are captured in the structured data graph, and can provide annotations as objects and/or relationships between objects based on the schema. For example, the entity hamburger can be provided as input, and the annotation "hamburger is a food" can be provided as output.

In some implementations, the one or more actions are determined based on respective entities and/or annotations. In some implementations, the device that provided the image data, e.g., the device 102 of FIG. 1, determines one or more actions based on the entities and/or annotations. For example, the device can provide a set of entities and/or a set of annotations, and can determine the one or more actions. As another example, the device can receive a set of entities and/or annotations, e.g., from the server system 104, and can determine the one or more actions. In some examples, the device provides a set of entities and/or a set of annotations, and the device also receives a set of entities and/or a set of annotations.

In some implementations, the device that provided the image data, e.g., the device 102 of FIG. 1, receives one or more actions based on the entities and/or annotations. For example, the device and/or the server system can provide a set of entities and/or a set of annotations, and the server system can determine the one or more actions. In some implementations, the device determines one or more actions, and the device receives one or more actions.

In some implementations, the one or more actions are provided based on mapping entities and/or annotations to actions. For example, an entity and/or annotation that is associated with an event, e.g., a concert, can be mapped to an add event action that can be executed to add an event to a calendar, and/or to a purchase action, e.g., to purchase tickets to the event, purchase albums. Consequently, the add event action and/or the purchase action can be included in the one or more events. As another example, an entity and/or annotation can correspond to an image album of the user, e.g., a Food album, and can be mapped to an add to album action that can be executed to add content, e.g., image, to an album.

Accordingly, the action is provided based on user-specific information, e.g., the knowledge that the user has an image album relevant to the entity depicted in the image. As another example, an entity and/or annotation can correspond to one or more contacts of the user, e.g., within a social networking service, and can be mapped to a share image action that can be executed to share the image with the contacts. Accordingly, the action is provided based on user-specific information, e.g., the knowledge that the user typically shares content depicted in the image with the particular contacts.

In accordance with implementations of the present disclosure, an action interface can be displayed based on the one or more actions. In some examples, the action interface is displayed in a viewfinder that displays the image data, e.g., from which the one or more actions were determined. In some examples, the action interface includes one or more action elements, each action element corresponding to an action of the one or more actions. Each action element is selectable to induce execution of the respective action. Accordingly, action elements of the action interface can include content-specific action elements, e.g., action elements provided based on actions, which were determined based on content of the image data.

In some implementations, the action interface can include an information frame that provides information regarding content, e.g., entities, depicted in the image data. For example, if a particular book is represented in the image data, the action interface can include an information frame that depicts information associated with the book, e.g., image of the cover, title, summary, author, publication date, and genre. As another example, if a particular band is represented in the image data, the action interface can include an information frame that depicts information associated with the band, e.g., picture of the band, a list of band members, a list of albums.

In some implementations, the action interface can include content-agnostic action elements. In some examples, a content-agnostic action element corresponds to an action that can be provided regardless of the content of the image data. For example, the image data can correspond to an image that was captured by the camera. Consequently, a share action element can be provided to share the image. In some examples, the share action element is provided in response to the image being captured, and not the content depicted in the image.

Implementations of the present disclosure are described in further detail herein in the context of non-limiting examples.

It is contemplated that implementations of the present disclosure can be realized in any appropriate contexts including, and in addition to the examples provided herein.

Figure 2:
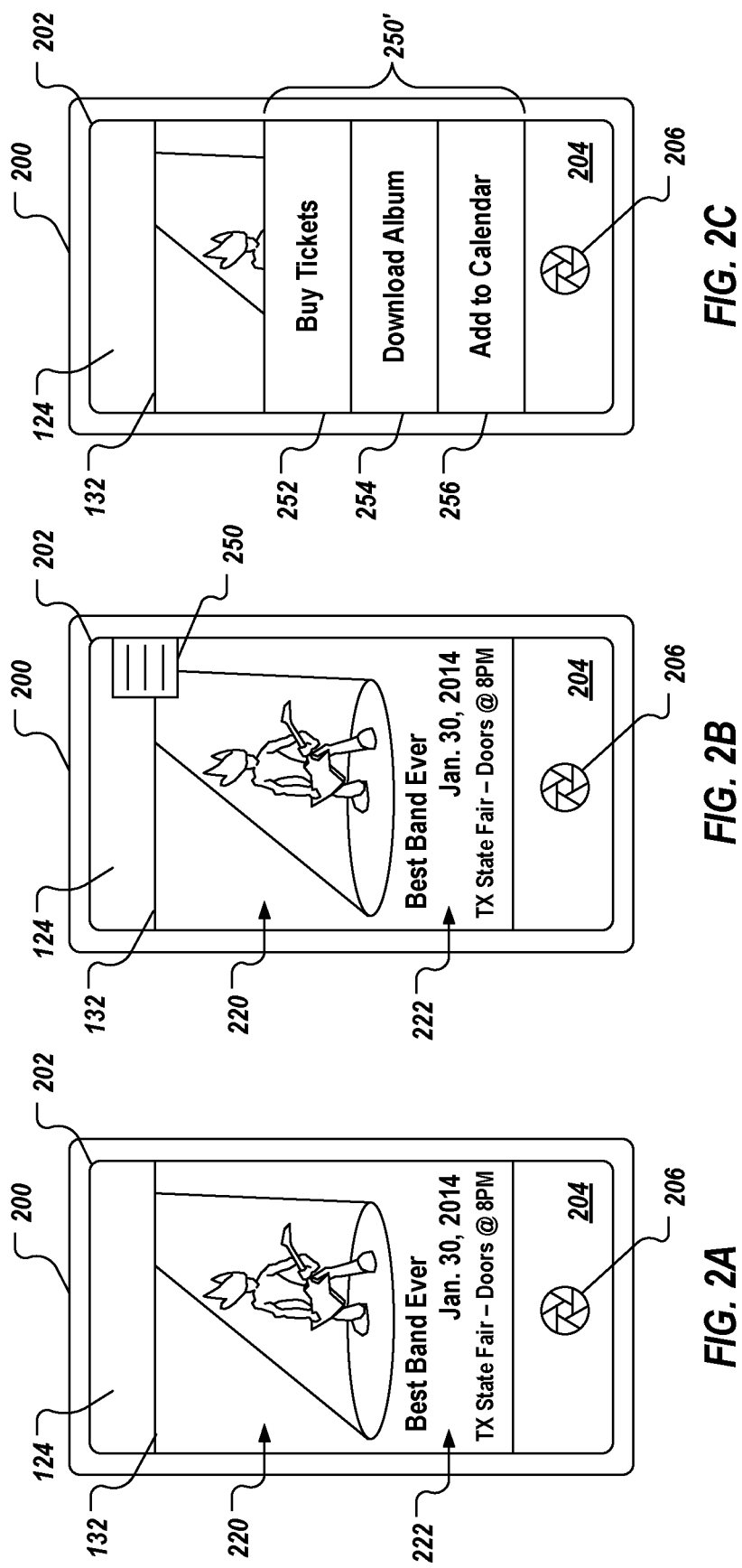
FIGS. 2A-2C depict example interfaces in accordance with implementations of the present disclosure.

FIGS. 2A-2C depict example interfaces in accordance with implementations of the present disclosure. With particular reference to FIG. 2A, a device 200, e.g., the device 102 of FIG. 1, includes a display 202. In the depicted example, the display 202 is displaying a viewfinder 204. For example, the viewfinder 204 can be displayed in response to user-selection of a camera application, e.g., a computer-executable program executed by the device 200. The viewfinder 204 includes a capture icon 206. In some examples, a user, e.g., the user 140 of FIG. 1, can select the capture icon 206 to capture an image of a scene displayed in the viewfinder 204. In the depicted example, the viewfinder 204 is displaying the scene 124 of FIG. 1, which includes the poster 132. For example, the user can point the device 200 toward the scene 124, such that the camera views the scene 124 and displays the scene 124 in the viewfinder 204.

In accordance with implementations of the present disclosure, image data is provided, which is used to display the scene 124 in the viewfinder 204. In some examples, the image data is processed to identify one or more entities from content of the scene 124. In the depicted example, example content can include artwork 220 provided in the poster 132, and text 222 provided in the poster 132. In the depicted example, the artwork 220 includes an image of a guitarist in a spotlight, and the text 222 includes a name of a band, e.g., "Best Band Ever," a date, e.g., "Jan. 30, 2014," a location, e.g., "TX State Fair," and other information, e.g., "Doors @ 8 PM." In some implementations, the image data is processed to identify the band "Best Band Ever" as an entity, the date "Jan. 30, 2014" as an entity, the time "8 PM" as an entity, and/or the location "TX State Fair" as an entity.

In some implementations, one or more annotations are provided based on the one or more entities. For example, one or more annotations can be provided based on the entity "Best Band Ever." Example annotations can include "name," "band," "music," and a category of music, e.g., "rock," "indie," "classical." As another example, one or more annotations can be provided based on the entity "TX State Fair." Example annotations can include "location," "venue," and "concerts." In some examples, annotations can be provided as image-specific structured data received from a knowledge graph system, as described herein.

In some implementations, one or more actions are provided based on the one or more entities and/or the image-specific structured data. In view of the example of FIGS. 2A-2C, actions can include a purchase ticket action that can be executed to initiate purchase of tickets to the concert depicted in the poster, an add event action that can be executed to add the concert as an event to a calendar, and a download action that can be executed to initiate downloading of an album of the band.

FIG. 2B depicts the viewfinder 204 in response to one or more actions being provided based on the image data. More particularly, a representation 250 of an action card is displayed in the viewfinder. In the depicted example, the representation 250 is a scaled version of the action card, such that representation 250 of the action card is smaller than it otherwise could be, and does not significantly interfere with the image displayed in the viewfinder 204. In some examples, the representation 250 is provided as a portion of the full action card. In some implementations, the user can select the representation 250 to initiate display of a full action card.

FIG. 2C depicts the viewfinder 204 in response to user selection of the representation 250 of FIG. 2B. In the depicted example, a full action card 250' is displayed and includes action elements 252, 254, 256. The action element 252 corresponds to the purchase ticket action, the action element 254 corresponds to the download action, and the action element 256 corresponds to the add event action. For example, in response to user selection of the action element 252, an interface can be displayed, through which the user can commence purchase of tickets to the concert. As another example, in response to user selection of the action element 254, an interface can be displayed, through which the user can commence purchase and/or download of one or more albums released by the band. As another example, in response to user selection of the action element 256, an interface can be displayed, through which the user can commence adding the concert as an event to a calendar. In some examples, interfaces that are displayed in response to user selection of an action element can be displayed as an interface of an application executed by the device 200, e.g., a mobile app, and/or as a web page displayed in a browser application executed by the device 200.

In some implementations, the action elements 252, 254, 256 include content-specific action elements. Although not depicted in FIG. 2C, the action card 250' can include content-agnostic action elements. For example, a share content action element can be provided to share the image with one or more other users.

In some implementations, actions can be executed in response to selection of an action element without requiring any additional user input. For example, in response to user selection of the action item 256, an event corresponding to the concert can be automatically added to a calendar without further user input.

Implementations of the present disclosure can further include one or more actions that are automatically executed without requiring the user to select the action. For example, a reminder action can be automatically executed in response to identifying an event depicted in the image data. Consequently, an event reminder can be provided to the user without the user explicitly requesting that they be reminded about the event. In some examples, the reminder can be enhanced to include content, e.g., images, video, associated with the event. It is contemplated that automatic actions can be provided in any appropriate context, e.g., events, sharing, add to album, and the like.

Referring again to FIG. 1, the user 140 can use the device 102 to provide image data based on the scene 122, the image data including respective representations of the drink 128 and the hamburger 130. The image data can be processed, as described herein, and one or more actions can be determined. Example actions can include an add image to Food album action, and/or an add image to Hamburger album action. For example, it can be determined that the image data depicts a hamburger and/or food, and that the user maintains a Food album and/or a Hamburger album. Consequently, an action interface can be displayed and can include respective, content-specific action elements.

As another example, the user 140 can use the device 102 to provide image data based on a scene that includes one or more persons, e.g., the user takes a picture of two friends, Michelle and Louise. The image data can be processed, as described herein, and one or more actions can be determined. For example, the image data can be processed, and it can be determined that Michelle and Louise are depicted in the image data. Example actions can include an add image to Friends album action, a share image with Michelle action, a share image with Louise action, and/or a share image with Michelle and Louise action.

Figure 3:
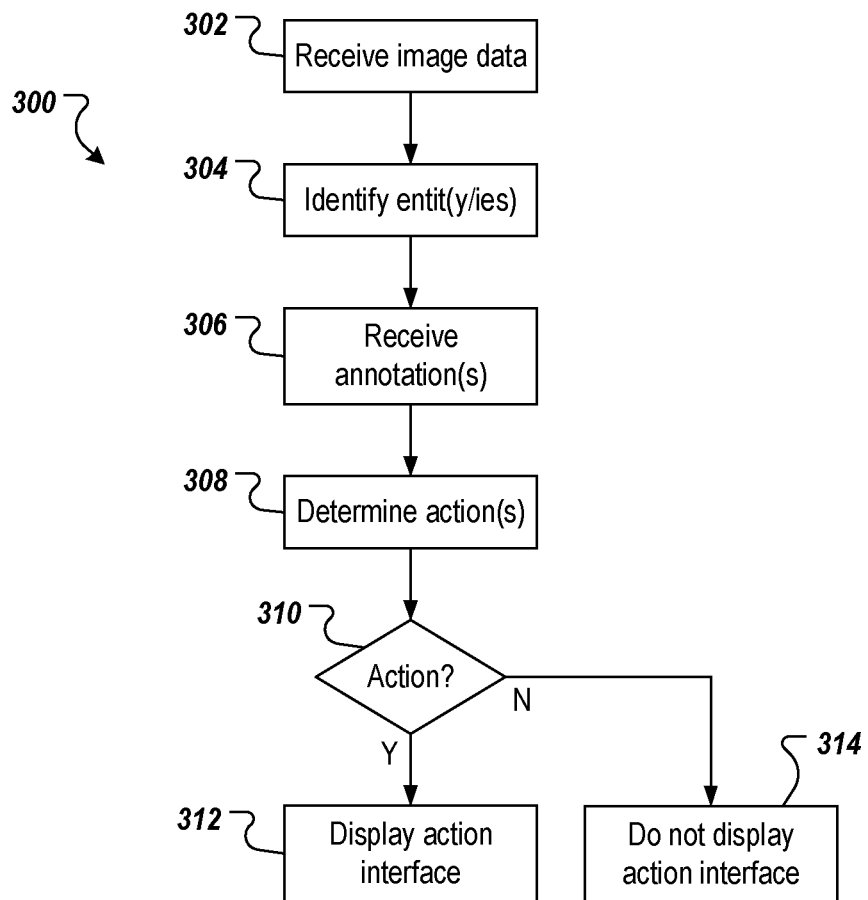
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1. In some examples, the example process 300 can be provided by one or more computer-executable programs executed using one or more computing devices, e.g., the device 102 and/or the server system 104 of FIG. 1.

Image data is received (302). In some examples, one or more processors of the device 102 and/or of the server system 104 receives the image data. In some examples, the image data is provided from a camera, e.g., of the device 102, and corresponds to a scene viewed by the camera. In some examples, the image data is pre-capture image data. In some examples, the image data is post-capture image data. One or more entities are identified (304). In some examples, the image data is processed by the computing device 102 and/or the server system 104 to identify the one or more entities. In some examples, an entity is provided as a person, place or thing that is represented in the image data.

One or more annotations are received (306). In some examples, the one or more entities and/or structured data are processed by the computing device 102 and/or the server system 104 to provide the one or more annotations. A set of actions are determined (308). In some examples, the one or more annotations are processed by the device 102 and/or the server system 104 to determine actions that can be executed. In some examples, it can be determined that no actions are determined. Consequently, the set of actions can include an empty set. In some examples, it can be determined that one or more actions are determined. Consequently, the set of actions can include one or more actions.

It is determined whether the set of actions includes at least one action (310). In some examples, the device 102 and/or the server system 104 can determine whether the set of actions includes at least one action. If the set of actions includes at least one action, instructions are provided to display an action interface (312). In some examples, the device I 02 and/or the server system I 04 can provide the instructions. For example, one or more processors of the device I 02 can provide instructions to a display processor of the device I 02. As another example, the server system I 04 can provide instructions to the device I 02. If the set of actions does not include at least one action, instructions are not provided to display an action interface (314).

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus.

Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LED (light-emitting diode) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   displaying, by a computing device comprising one or more processors, real-time image data captured by an image capture device of the computing device, wherein the real-time image data depicts a scene being captured in real-time by the image capture device of the computing device, and wherein the scene depicts a plurality of entities;
   obtaining, by the computing device, entity recognition data that identifies a first entity of the plurality of entities as belonging to a first category of entities;
   determining, by the computing device, one or more actions based on at least one of the first entity or the first category of entities;
   automatically performing, by the computing device, the one or more actions; and
   causing, by the computing device, display of an element indicative of performance of at least one of the one or more actions.

2. The computer-implemented method of claim 1, wherein causing display of the element indicative of the performance of at least one of the one or more actions comprises:
   displaying, by the computing device, the element indicative of the performance of at least one of the one or more actions.

3. The computer-implemented method of claim 1, wherein causing display of the element indicative of the performance of at least one of the one or more actions comprises:
   providing, by the computing device, the element indicative of the performance of at least one of the one or more actions for display at a display device of a wearable computing device worn by a user of the computing device.

4. The computer-implemented method of claim 3, wherein the wearable computing device comprises the computing device.

5. The computer-implemented method of claim 1, wherein automatically performing the one or more actions comprises:
displaying, by the computing device, a web page within a web browser executed by the computing device.

6. The computer-implemented method of claim 5, wherein the first entity of the plurality of entities comprises a purchasable item; and
wherein displaying the web page comprises:
displaying, by the computing device, a web page for purchasing the purchasable item within the web browser executed by the computing device.

7. The computer-implemented method of claim 6, wherein displaying the web page comprises:
displaying a web page for purchasing the purchasable item or one or more second purchasable items within the web browser executed by the computing device, wherein the one or more purchasable items belong to the first category of entities.

8. The computer-implemented method of claim 1, wherein automatically performing the one or more actions comprises:
displaying, by the computing device, an information frame that depicts information associated with the first entity.

9. The computer-implemented method of claim 8, wherein the at least one entity comprises content, and wherein the information frame depicts an identity of a creator of the content.

10. The computer-implemented method of claim 9, wherein the content comprises a fictional work, and wherein the information frame depicts an identity of a creator of the fictional work.

11. The computer-implemented method of claim 1, wherein obtaining the entity recognition data comprises:
processing, by the computing device, the real-time image data with an entity recognition engine to obtain the entity recognition data that identifies the first entity as belonging to the first category.

12. A computing device, comprising:
one or more processors; and
one or more tangible, non-transitory, computer readable media that collectively store instructions that when executed by the one or more processors cause the computing device to perform operations comprising:
displaying real-time image data captured by an image capture device of the computing device, wherein the real-time image data depicts a scene being captured in real-time by the image capture device of the computing device, and wherein the scene depicts a plurality of entities;
obtaining entity recognition data that identifies a first entity of the plurality of entities as belonging to a first category of entities;
determining one or more actions based on at least one of the first entity or the first category of entities;
automatically performing the one or more actions; and
causing display of an element indicative of performance of at least one of the one or more actions.

13. The computing device of claim 12, wherein causing display of the element indicative of the performance of at least one of the one or more actions comprises:
displaying the element indicative of the performance of at least one of the one or more actions.

14. The computing device of claim 12, wherein causing display of the element indicative of the performance of at least one of the one or more actions comprises:
providing the element indicative of the performance of at least one of the one or more actions for display at a display device of a wearable computing device worn by a user of the computing device.

15. The computing device of claim 14, wherein the wearable computing device comprises the computing device.

16. The computing device of claim 12, wherein automatically performing the one or more actions comprises:
displaying a web page within a web browser executed by the computing device.

17. The computing device of claim 16, wherein the first entity of the plurality of entities comprises a purchasable item; and
wherein displaying the web page comprises:
displaying a web page for purchasing the purchasable item within the web browser executed by the computing device.

18. The computing device of claim 17, wherein displaying the web page comprises:
displaying a web page for purchasing the purchasable item or one or more second purchasable items within the web browser executed by the computing device, wherein the one or more purchasable items belong to the first category of entities.

19. The computing device of claim 12, wherein automatically performing the one or more actions comprises:
displaying an information frame that depicts information associated with the first entity.

20. One or more tangible, non-transitory, computer-readable media that collectively store instructions when executed by one or more processors of a computing system cause the one or more processors to perform operations, the operations comprising:
displaying real-time image data captured by an image capture device of the computing device, wherein the real-time image data depicts a scene being captured in real-time by the image capture device of the computing device, and wherein the scene depicts a plurality of entities;
obtaining entity recognition data that identifies a first entity of the plurality of entities as belonging to a first category of entities;
determining one or more actions based on at least one of the first entity or the first category of entities;
automatically performing the one or more actions; and
causing display of an element indicative of performance of at least one of the one or more actions.

* * * * *